US00RE35488E

United States Patent [19]

Sposato

[11] E Patent Number: Re. 35,488

[45] Reissued Date of Patent: Apr. 1, 1997

[54] BOWLING BALL

[75] Inventor: Richard Sposato, Syracuse, N.Y.

[73] Assignee: Lane No. 1, Inc., E. Syracuse, N.Y.

[21] Appl. No.: 518,655

[22] Filed: Aug. 24, 1995

Related U.S. Patent Documents

Reissue of:

[64] Patent No.: 5,238,245
Issued: Aug. 24, 1993
Appl. No.: 923,606
Filed: Aug. 3, 1992

[51] Int. Cl.[6] ..... A63B 37/14

[52] U.S. Cl. ..... 473/126

[58] Field of Search ..... 473/126

[56] References Cited

U.S. PATENT DOCUMENTS

| | | | |
|---|---|---|---|
| 3,400,929 | 9/1968 | Fabanich | 473/126 |
| 3,441,274 | 4/1969 | Collins | 473/126 |
| 3,591,177 | 7/1971 | Skuse | 473/126 |
| 3,865,369 | 2/1975 | Randolph | 473/126 |
| 4,131,277 | 12/1978 | Randolph | 473/126 |
| 4,183,527 | 1/1980 | Amburgey | 473/126 |
| 4,320,899 | 3/1982 | Salvino | 473/126 |
| 4,523,757 | 6/1985 | Swett et al. | 473/126 |
| 4,913,429 | 4/1990 | Fabanich | 473/126 |

FOREIGN PATENT DOCUMENTS

| | | | |
|---|---|---|---|
| 27680 | of 1912 | United Kingdom | 473/126 |

*Primary Examiner*—George J. Marlo
*Attorney, Agent, or Firm*—George R. McGuire

[57] ABSTRACT

A bowling ball having an elongated weight member integrally incorporated therein for enhancing the ball's inherent, angular momentum as it travels down a lane. The weight member has a longitudinal axis with a maximum cross-section at an intermediate axial position, and an inward, uniform taper extending from this intermediate axial position towards opposite, terminal ends. When the ball is released with the axis of the weight member in a predetermined orientation with respect to the bowler's track, as determined by the position of the grip hole(s) relative to the weight block, pin action is enhanced thereby producing consistently higher scores.

9 Claims, 2 Drawing Sheets

BOWLING BALL

Matter enclosed in heavy brackets [ ] appears in the original patent but forms no part of this reissue specification; matter printed in italics indicates the additions made by reissue.

BACKGROUND OF THE INVENTION

This invention relates to bowling balls and, more particularly, to novel and improved means incorporated into the structure of a bowling ball for regulating the dynamic balance of the ball while maximizing the physical properties inherent in the ball.

Bowling balls are conventionally composed of a machineable, thermosetting plastic having a smooth, spherical, outer surface. The ball may comprise a single, homogeneous plastic material, or may include a spherical core of one material surrounded by a shell of uniform thickness and of another material. In any case, it is a common practice to incorporate a weight member, also normally of a suitable material having a density significantly higher than that of the surrounding material, within the ball. The weight member is normally placed so that the center of gravity of the ball is at a location other than the geometric center of the ball. The location of the center of gravity is also changed when finger and thumb grip holes, and sometimes a balance hole, are drilled into the ball.

The action of the bowling ball as it travels down a lane is dependent upon the direction and velocity imparted by bowler's release, as well as the position of the weight block, and the amount of weight and location of the center of gravity. When a bowling ball is released in the usual manner, it tends to first rotate while sliding along the alley in its initial travel, and then change, at some point, depending on the factors mentioned above, from a sliding to non-sliding rotation. That is, in its initial travel, the axis of rotation of the ball is not parallel to the surface of the lane. The portion of the ball which contacts the lane surface during the sliding portion of the rotation is known as the bowler's "track". The track is a circle on the ball's surface other than a great circle and its position relative to the grip holes is dependent upon the factors set forth above. After a bowler has used a particular ball for a time, the position of the track is visually discernable.

The path of the ball is not the same during the slide and roll portions of the ball's travel. The change of direction experienced by the ball is known as the "break" or "snap". The point in the ball's travel where the break begins, as well as the relative abruptness, also depend largely on the factors noted above. Of course, the coefficient of friction between the ball and the lane also has a significant effect; thus, it is not uncommon for a bowler to have more than one ball, each having characteristics suited to the bowler's preference for the particular lane.

A primary object of a bowler is to achieve maximum striking power and pin action. To achieve this, it is necessary for a bowler to use a consistent delivery or release, and that the ball have balance characteristics, a center of gravity located to provide an optimum break point for a particular release, and inherent characteristics which produce a maximum mount of angular momentum for a given release.

The American Bowling Congress has set forth rules which must be abided by in competitive bowling. Included in these rules are the standards which define the "balance characteristics" previously mentioned. The rules state when the ball is weighed with the finger holes facing upwardly and the thumb hole positioned adjacent the weigher, the imbalance to the left and right, and fore and aft must not exceed one ounce, and the imbalance between the top and bottom must not exceed three ounces.

Once a bowler has acquired sufficient experience and technique to develop a reasonably consistent release, the balance characteristics and center of gravity location of the ball must be established to optimize ball action, and thus score, for that particular release on a lane of known characteristics. The bowler's release, basically a combination of velocity, lift and spin imparted by the bowler, as well as the position of the circular area on the ball surface which contacts the lane during ball travel. The track concentrically surrounds the axis of rotation which, in virtually all cases, is disposed at an oblique angle with respect to the horizontal lane surface. The further the weight block is removed from the track, the longer the ball will slide and the sharper it will break. Conversely, the closer the weight block is to the track, the earlier in its travel the ball will begin to roll and the more gradual the break.

The grip holes are drilled in the ball at a position relative to the weight block and the bowler's normal track to provide the general characteristics of slide, roll, and break desired for the particular bowler's delivery or release. In order to optimize balance characteristics, it may be necessary to drill an additional hole, removing sufficient material from the ball to produce the desired amount of relative imbalances between the three sets of ball hemispheres. U.S. Pat. No. 5,042,163 of the present inventor discloses methods and means of determining where on the ball's surface to drill and how much material to remove therefrom to provide optimum ball action for the particular bowler using the ball.

The present invention is concerned with incorporating into a bowling ball a weighted member having a shape which will optimize the ball's angular momentum for a given release, thus increasing the amount of pin action a bowler produces without changing his/her release. Furthermore, if the present invention is used in conjunction with applicant's aforementioned patent, the bowling ball will also be dynamically balanced (or imbalanced) in the manner best suited to the bowler's release and/or lane characteristics.

In the past, weighted members have been placed within a bowling ball for the sole purpose of compensating for weight removed from the ball in drilling finger and thumb holes. U.S. Pat. No. 4,320,899 issued to Salvino on Mar. 23, 1982 discloses a bowling ball construction in which a pair of rectilinear weight blocks are placed in the ball for the purpose of making all axes of the ball equal, thus eliminating wobble as it travels down the lane.

U.S. Pat. No. 4,913,429 issued to Fabanich on Apr. 3, 1990 discloses a bowling ball having a solid core which is substantially spherical in configuration. This core further includes a top weight of generally conical shape, and two extending side wings which are generally alike in configuration but placed at different angles with respect to each other. This weighted member's main disadvantage lies in the general nature of its shape; aside from being difficult to cast, too much weight is devoted to it's spherical center, thus producing a ball which is not much more useful than a bowling ball made without a weighted member.

U.S. Pat. Nos. 3,591,177 to Skuse and 3,865,369 to Randolph show further ball weights whose intended purpose is to offset the loss of material from the boring of grip holes.

It is a primary object of this invention to provide a bowling ball having a weighted member positioned therein which will optimize the ball's angular momentum for any given delivery, thus creating more pin action and raising a bowler's score.

It is another object of this invention to provide a bowling ball which will give a bowler the balance characteristics desired. Other objects will in part be obvious and in part appear hereinafter.

SUMMARY OF THE INVENTION

In accordance with the objects of the present invention, there is provided a bowling ball having a novel and improved weight block placed therein. The weight block is, in general, a longitudinal object having a maximum cross-section at an intermediate axial position, and an inward taper going from this intermediate axial position to opposite, terminal ends. The weight block is constructed from a material having a density significantly higher than that of its surrounding cover.

In addition to providing a ball which gives the desired balance characteristics, the present invention also provides a ball which can possess a very large quantity of angular momentum when rolled down a lane. By studying a bowler's track as previously noted, a skilled ball technician can further determine where to drill the grip holes to cause the ball to break early or late. If the bowler desires an early break, the ball should be drilled so that the spin axis of the ball is not coincident to the longitudinal axis of the weight block, and that the roll axis of the ball is coincident with the longitudinal axis of the ball. This allows the ball to continually build up momentum as it rolls down the lane since it is expending very little energy to roll, thus hitting the pins with a large quantity of angular momentum. For a bowler who desires a late break of the ball, grip holes should be drilled in the position on the ball which would cause the spin axis of the ball to substantially coincide with the longitudinal axis of the weight, and the roll axis of the ball to coincide with the transverse axis of the weight. This allows the ball to build up a large quantity of angular momentum quickly by expending large quantities of energy. In either case the ball of the present invention will give greater "pin action" and therefore give a bowler consistently higher scores.

DETAILED DESCRIPTION

Figure 1:
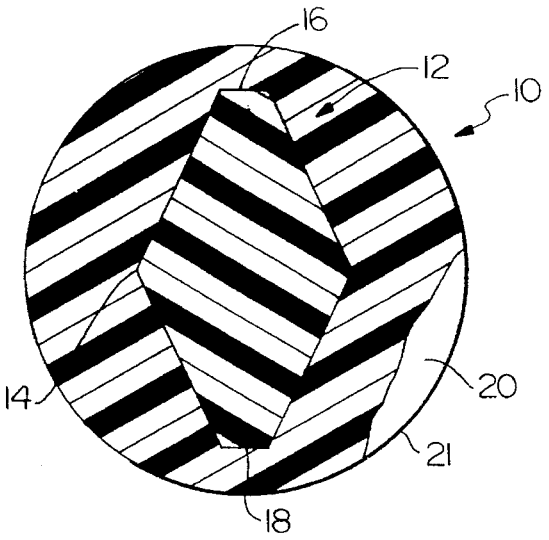
FIG. 1 is a cross-sectional view showing the symmetric weight block positioned symmetrically within the bowling ball.
Figure 2:
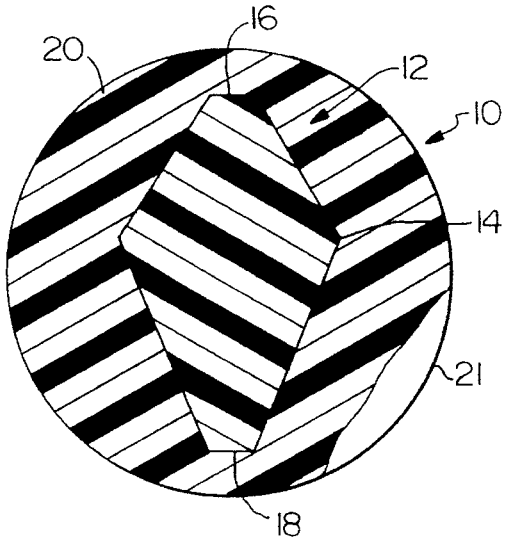
FIG. 2 is a cross-sectional view showing the symmetric weight block positioned unsymmetrically within the bowling ball.
Figure 3:
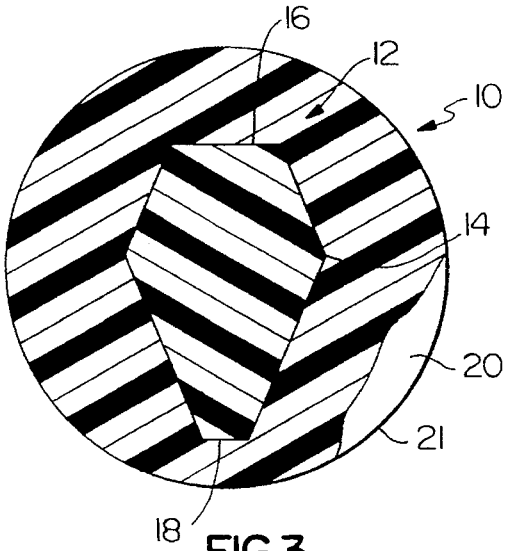
FIG. 3 is a cross-sectional view showing the unsymmetric weight block positioned within the bowling ball.
Figure 4:
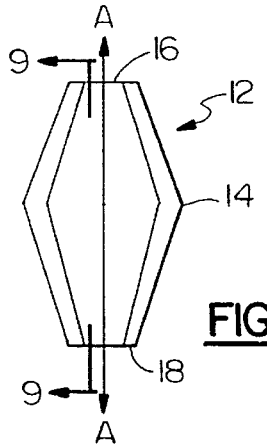
FIG. 4 is a front elevational view of the weight block positioned vertically.
Figure 5:
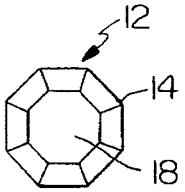
FIG. 5 is an end elevational view of the weight block.

Referring now to the drawings, in FIGS. 1–3 a bowling ball denoted generally by reference numeral 10, is shown with weight member 12 positioned therein. As best seen in FIGS. 4 and 5, weight member 12 is substantially symmetrical about a central, linear axis A—A and is generally shaped in the form of two oppositely directed cones. Weight member 12 has a maximum cross-section at an intermediate axial position 14 and uniformly tapers inward from said intermediate axial position 14 to opposite terminal ends 16 and 18. This shape gives a substantially larger moment of inertia than in prior art weighted members, thus giving the balls having this weight member inserted therein greater angular momentum. Consequently, this will give a bowler greater pin action for a given release. Weight member 12 may be fabricated by compressing a powder material, such as barium sulfate or any equivalent thereof, into a dense mold. Weight member 12 may have a plurality of planar sides, as shown, or it may have a smooth, circular outer surface (i.e., two oppositely directed right, circular cones). In either case, weight member 12 will have a non-circular cross-section in all planes parallel to linear axis A—A. Also, weight member 12 may taper continuously to a point at both ends if desired rather than being truncated.

Cover 20 completely surrounds weight member 12. Cover 20 is molded around weight member 12 and has a substantially spherical, smooth outer surface 21, and a pair of finger holes 22 and 24 and a thumb hole 26 extending blindly from outer surface 21 into ball 10. Cover 20 is made from a thermosetting plastic, such as polyurethane, or any equivalent thereof.

Figure 6:
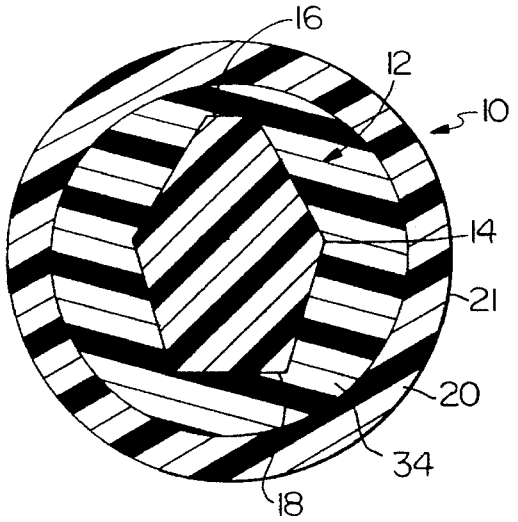
FIG. 6 is a cross-sectional view of a second embodiment showing the bowling ball having a middle core positioned between the weight member and the outer cover.
Figure 7:
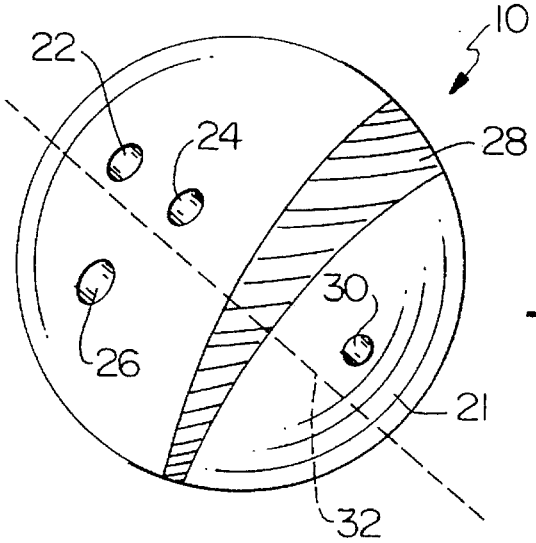
FIG. 7 is a perspective view of the bowling ball showing the track of the ball.
Figure 8:
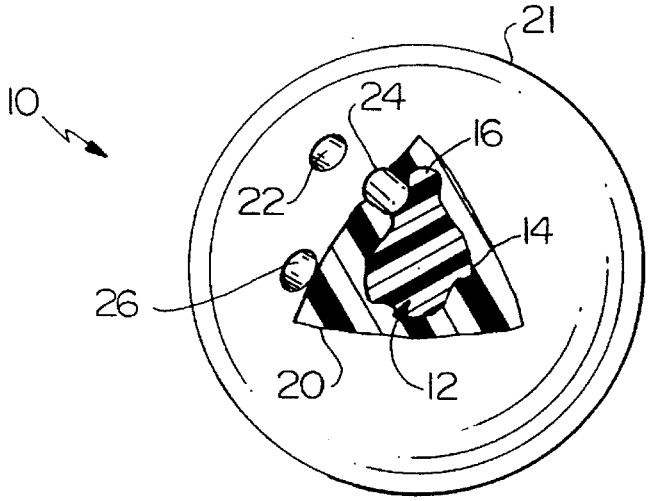
FIG. 8 is a perspective view of the bowling ball with a section removed.
Figure 9:
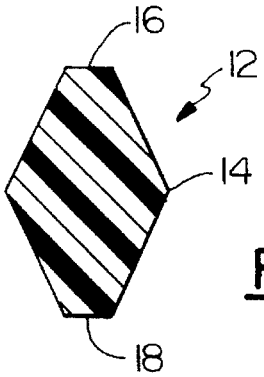
FIG. 9 is a cross-sectional view of the weight block taken along line 9—9 of FIG. 4.

After a bowler has achieved a fairly consistent release, the ball being used will develop a track 28 (FIG. 6). From examining a bowlers track when using a ball of known characteristics (i.e., balance weigh) and considering the bowler's desired ball characteristics, a skilled ball technician can determine where to drill grip holes, such as grip holes 22, 24 and 26, with respect to orientation of weight member 12 and the position of the center of gravity. If, after the grip holes are drilled, the bowler desires further balance, a balance hole 30 can be drilled. To determine the position and depth of balance hole 30, a ball technician can use any number of tools. If imbalance or offset of the center of gravity from the ball center in a certain direction is desired, weight member 12 may be truncated, as shown in FIG. 3, thus eliminating more of the mass from one end of the weight than the other, and/or weight member 12 may be placed off center, as shown in FIG. 2, thus placing more mass in one hemisphere than in the other.

If a bowler desires a ball which breaks early after release, the ball technician drilling the ball should position the grip holes 22, 24 and 26 such that track 28 and thus spin axis 32 are substantially parallel with the longitudinal axis of ball 10. If a bowler desires a ball which breaks late after delivery, grip holes 22, 24 and 26 should be drilled substantially perpendicularly to spin axis 32.

Weight member 12 may be made any size, entirely surrounded by outer surface 20, with the only criteria being that the length of member 12 must be greater than the largest diameter of member 12. Furthermore, weight member need -not only be placed in a conventional ball, such as ball 10, *but* may also be placed in a ball [11] *10*, as shown in FIG. 6, where ball [11] *10* has in addition [t] *to* the weight member 12 and outer cover 20 a spherical intermediate plastic layer 34 disposed between weight block 12 and outer cover 20.

What is claimed is:

1. A bowling ball consisting essentially of:

a) a solid body having a substantially spherical outer surface and a first homogenous density;

b) said body including one or more concentric layers, the inner most of said layers being a solid sphere and any other layers being of substantially constant thickness, surrounding and contacting the next inner layer, each of said layers being of predetermined homogenous density; and c) a single, elongated weight member integrally positioned within and entirely surrounded by said body, said weight member being substantially symmetrical about a central, linear axis and having first and second terminal ends, a maximum cross-section at an intermediate axial position between said first and second ends, a [second homogeneous] density substantially greater than said first homogenous density and said predetermined homogenous density, an inward taper extending over at least a portion of its length from said intermediate axial position to each of said first and second ends, and a non-circular cross-section in all planes parallel to said linear axis.

2. The invention according to clam 1 wherein said ball has a center of gravity offset from the geometric center of said ball.

3. The invention according to clam 1 wherein said ball has a center of gravity coincident with the geometric center of said ball.

4. The invention according to claim 1 wherein said first and second ends are equidistant from said intermediate axial position.

5. The invention according to claim wherein one of said first and second terminal ends is positioned closer to said intermediate axial position than the other of said first and second ends.

6. The invention according to claim 1 wherein said weight member is of polygonal cross-section in all planes transverse to said linear axis.

7. The invention according to clam 1 wherein said weight member tapers uniformly from said intermediate axial position to each of said first and second ends.

8. The invention according to claim 1 wherein said body includes at least one blind grip hole extending from said outer surface into said body.

*9. The invention according to claim 1 wherein said weight member's density is homogenous throughout.*

* * * * *